US010365712B2

(12) United States Patent
Xu et al.

(10) Patent No.: US 10,365,712 B2
(45) Date of Patent: Jul. 30, 2019

(54) OBJECT TRACKING IN A HEAD MOUNTED REFERENCE FRAME IN AN AUGMENTED AND/OR VIRTUAL REALITY ENVIRONMENT

(71) Applicant: GOOGLE INC., Mountain View, CA (US)

(72) Inventors: Zhaoyang Xu, Mountain View, CA (US); Murphy Stein, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 155 days.

(21) Appl. No.: 15/386,926

(22) Filed: Dec. 21, 2016

(65) Prior Publication Data

US 2017/0336862 A1 Nov. 23, 2017

Related U.S. Application Data

(60) Provisional application No. 62/337,465, filed on May 17, 2016.

(51) Int. Cl.

| | |
|---|---|
| ***G06F 3/01*** | (2006.01) |
| ***G02B 27/01*** | (2006.01) |
| ***G06F 3/0346*** | (2013.01) |
| ***G06F 3/038*** | (2013.01) |
| ***G06T 3/20*** | (2006.01) |

(Continued)

(52) U.S. Cl.

CPC ........... *G06F 3/012* (2013.01); *G02B 27/017* (2013.01); *G06F 3/011* (2013.01); *G06F 3/038* (2013.01); *G06F 3/0346* (2013.01); *G06T 3/20* (2013.01); *G06T 11/60* (2013.01); *G09G 5/12* (2013.01); *G02B 2027/0187* (2013.01); *G09G 2354/00* (2013.01)

(58) Field of Classification Search

None

See application file for complete search history.

(56) References Cited

U.S. PATENT DOCUMENTS

| | | | |
|---|---|---|---|
| 4,048,653 | A | 9/1977 | Spooner |
| 2011/0250962 | A1 | 10/2011 | Feiner et al. |

(Continued)

OTHER PUBLICATIONS

International Search Report and Written Opinion Received for PCT Application No. PCT/US2016/068236, dated Apr. 12, 2017, 17 pages.

*Primary Examiner* — Brian M Butcher

(74) *Attorney, Agent, or Firm* — Brake Hughes Bellermann LLP

(57) ABSTRACT

A system for tracking an object in an ambient environment with respect to a head mounted reference frame may allow the ambient object to be rendered in a virtual display, at a virtual position corresponding to its position in the ambient environment, in response to head movement. The system may detect a position of a head mounted device with respect to a fixed frame of reference in the ambient environment, and may detect an position of the ambient object with respect to the fixed frame of reference in the ambient environment. The system may then translate the detected position of the ambient object to the frame of reference of the head mounted device, or to the head mounted reference frame, to determine a position of the ambient object relative to the head mounted device. This newly determined position may be rendered in the virtual display generated by the head mounted device.

21 Claims, 10 Drawing Sheets

900

Initiate AR/VR experience 910

Head movement detected? 920 — No / Yes

Updated measure of ambient object position taken? 930 — Yes / No

Apply rules and/or algorithm based on detected head movement and/or detected ambient object movement 940

Determine updated position of ambient object 950

Render ambient object in virtual display at updated position 960

VR/AR terminated? 970 — No / Yes

End

(51) Int. Cl.
*G06T 11/60* (2006.01)
*G09G 5/12* (2006.01)

(56) References Cited

U.S. PATENT DOCUMENTS

| | | | |
|---|---|---|---|
| 2014/0176591 | A1 | 6/2014 | Klein et al. |
| 2014/0354515 | A1 | 12/2014 | LaValle et al. |
| 2015/0091780 | A1 | 4/2015 | Lyren |
| 2015/0235451 | A1 | 8/2015 | Schowengerdt et al. |
| 2016/0189429 | A1 | 6/2016 | Mallinson |

OBJECT TRACKING IN A HEAD MOUNTED REFERENCE FRAME IN AN AUGMENTED AND/OR VIRTUAL REALITY ENVIRONMENT

CROSS REFERENCE TO RELATED APPLICATION(S)

This application is a Non-Provisional of, and claims priority to, U.S. Provisional Application No. 62/337,465 filed on May 17, 2016, the disclosure of which is incorporated by reference herein in its entirety.

FIELD

This relates, generally, to detection and tracking of objects in an augmented and/or virtual reality environment.

BACKGROUND

An augmented reality (AR) and/or a virtual reality (VR) system may generate an immersive, three-dimensional (3D) virtual environment. A user may experience this virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual environment, user interaction with the virtual environment may take various forms, such as, for example, physical movement and/or manipulation of the handheld electronic device and/or the head mounted device to interact with, personalize and control the virtual environment.

SUMMARY

In one aspect, a computer-implemented method may include generating and displaying a virtual environment on a display of a head mounted electronic device, the head mounted electronic device operating in an ambient environment; detecting an ambient object in the ambient environment; detecting a first ambient position of the ambient object in the ambient environment; displaying a virtual rendering of the ambient object at a first virtual position in the display of the virtual environment, the first virtual position corresponding to the detected first ambient position of the ambient object in the ambient environment; detecting a movement of the head mounted electronic device, from a first position of the head mounted electronic device to a second position of the head mounted electronic device; updating a position of the ambient object in the ambient environment based on the detected movement of the head mounted electronic device; and displaying the virtual rendering of the ambient object at a second virtual position in the display of the virtual environment based on the updated position of the ambient object in the ambient environment.

In another aspect, computer program product may be embodied on a non-transitory computer readable medium. The computer readable medium may have stored thereon a sequence of instructions. When executed by a processor, the instructions may cause the processor to execute a method, the method including displaying a virtual environment on a display of a head mounted electronic device operating in an ambient environment; detecting a handheld electronic device in the ambient environment, the handheld electronic device operating in the ambient environment, and the handheld electronic device being operably coupled to the head mounted electronic device; detecting a first ambient position of the handheld electronic device in the ambient environment; displaying a virtual rendering of the handheld electronic device at a first virtual position in the display of the virtual environment, the first virtual position corresponding to the detected first ambient position of the handheld electronic device in the ambient environment; detecting a movement of the head mounted electronic device, from a first position of the head mounted electronic device to a second position of the head mounted electronic device; updating a position of the handheld electronic device in the ambient environment based on the detected movement of the head mounted electronic device; and displaying the virtual rendering of the handheld electronic device at a second virtual position in the display of the virtual environment based on the updated position of the handheld electronic device in the ambient environment.

In another aspect, a computing device may include a memory storing executable instructions, and a processor configured to execute the instructions. Execution of the instructions may cause the computing device to display, on a display of a head mounted electronic device operating in an ambient environment, a virtual environment; detect a handheld electronic device in the ambient environment, the handheld electronic device operating in the ambient environment, and the handheld electronic device being operably coupled to the head mounted electronic device; detect a first ambient position of the handheld electronic device in the ambient environment; display a virtual rendering of the handheld electronic device at a first virtual position in the display of the virtual environment, the first virtual position corresponding to the detected first ambient position of the handheld electronic device in the ambient environment; detect a movement of the head mounted electronic device; update a position of the handheld electronic device in the ambient environment based on the detected movement of the head mounted electronic device and sensor data received from the handheld electronic device and the head mounted electronic device; display the virtual rendering of the handheld electronic device at the first virtual position in the display of the virtual environment when a magnitude of the detected movement is less than a previously defined threshold; and display the virtual rendering of the handheld electronic device at a second virtual position in the display of the virtual environment when the magnitude of the detected movement is greater than or equal to the previously defined threshold.

The details of one or more implementations are set forth in the accompanying drawings and the description below. Other features will be apparent from the description and drawings, and from the claims.

DETAILED DESCRIPTION

A user in an ambient environment, or physical, real world space, immersed in an augmented and/or virtual reality environment wearing, for example, a head mounted display (HMD) device may explore the 3D virtual environment and interact with virtual features, objects, elements and the like in the virtual environment through, for example, manipulation of the HMD and/or a separate electronic device, physical interaction such as, for example, hand/arm gestures, head movement, walking, and the like. For example, in some implementations, the HMD may be paired with a handheld electronic device, such as, for example, a controller, a gyromouse, or other such external computing device. These types of electronic devices, such as, for example, the handheld electronic device, may be an example of an ambient object operating ambient environment. User manipulation of the handheld electronic device paired with the HMD may allow the user to interact with the features in the virtual environment generated by the HMD.

In some situations, the handheld electronic device may not be visible to the user, such as, for example, when the virtual environment is displayed to the user on a display screen of the HMD, and the ambient environment is not visible to the user while wearing the HMD and experiencing the virtual environment. In this situation, the system may track the position and/or orientation and/or movement of the handheld electronic device, and may generate and display a visual representation of the handheld electronic device to the user in the virtual environment to facilitate the user's interaction with and/or manipulation of the handheld electronic device. The visual representation of the handheld electronic device may be, for example, a camera pass through image, a rendering, and the like, displayed to the user as a virtual object in the virtual environment generated by the HMD.

When using, for example, a camera mounted on the HMD (or a base station camera) to capture images of the handheld electronic device for tracking the position and/or orientation and/or movement of the handheld electronic device (in some instances together with position and/or orientation data generated by the handheld electronic device), the user's head (and consequently, the HMD worn on the user's head) may move between the time at which a measurement of position and/or orientation of the handheld electronic device is taken (i.e., a point at which the camera captures an image) and the time at which processing is complete and the position and/or orientation of the handheld electronic device is determined and ready to be rendered and/or otherwise displayed to the user in the virtual environment. This may cause a discrepancy between a position at which the handheld electronic device is rendered in the virtual environment and the actual location of the handheld electronic device in the ambient environment.

Figure 1:
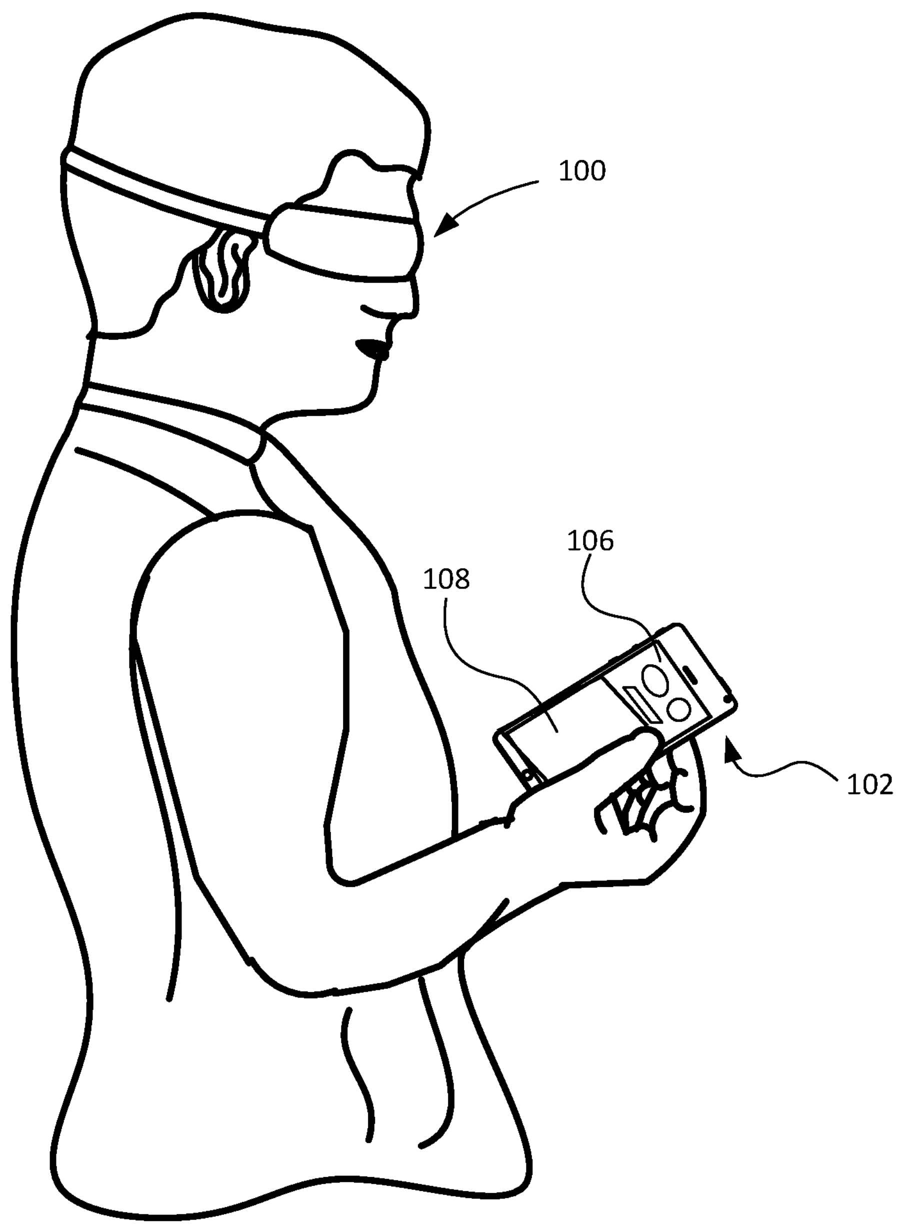
FIG. 1 is an example of a virtual reality system including a head mounted display device and a handheld electronic device, in accordance with implementations as described herein.

In the example implementation shown in FIG. 1, a user wearing an HMD 100 is holding a portable handheld electronic device 102. As noted above, the handheld electronic device 102 may be, for example, a controller for use in the virtual environment, a gyromouse, and/or other external computing device configured to be operably coupled with and communicate with the HMD 100, and that may be detected and tracked so that a six degree of freedom position and/or orientation of the device may be detected and tracked. A single handheld electronic device 102 is included in the example shown in FIG. 1, simply for ease of discussion and illustration. However, the principles to be described herein may be applied to situations in which one or more handheld electronic devices and/or other types of external computing devices, are operably coupled to the HMD. Simply for ease of discussion and illustration, hereinafter, the handheld electronic device 102 will be referred to as a controller 102.

Figure 2A:
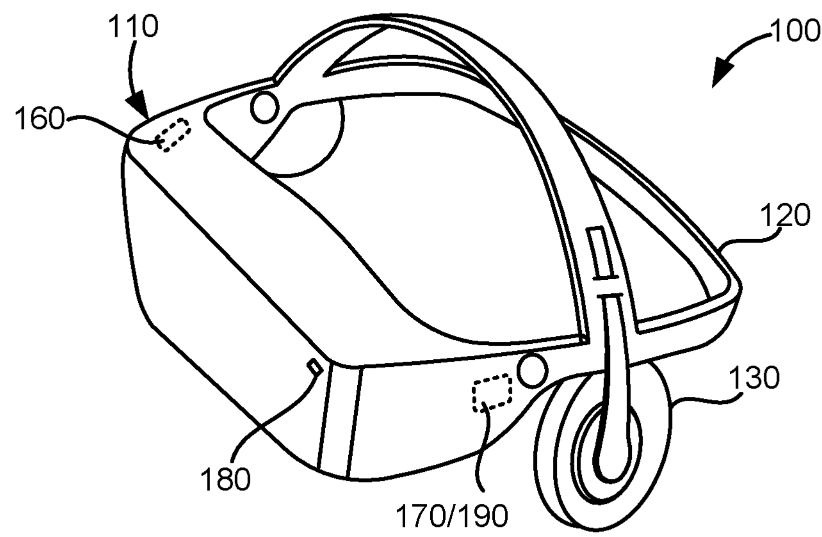
FIGS. 2A and 2B are perspective views of an example head mounted display device, in accordance with implementations as described herein.
Figure 2B:
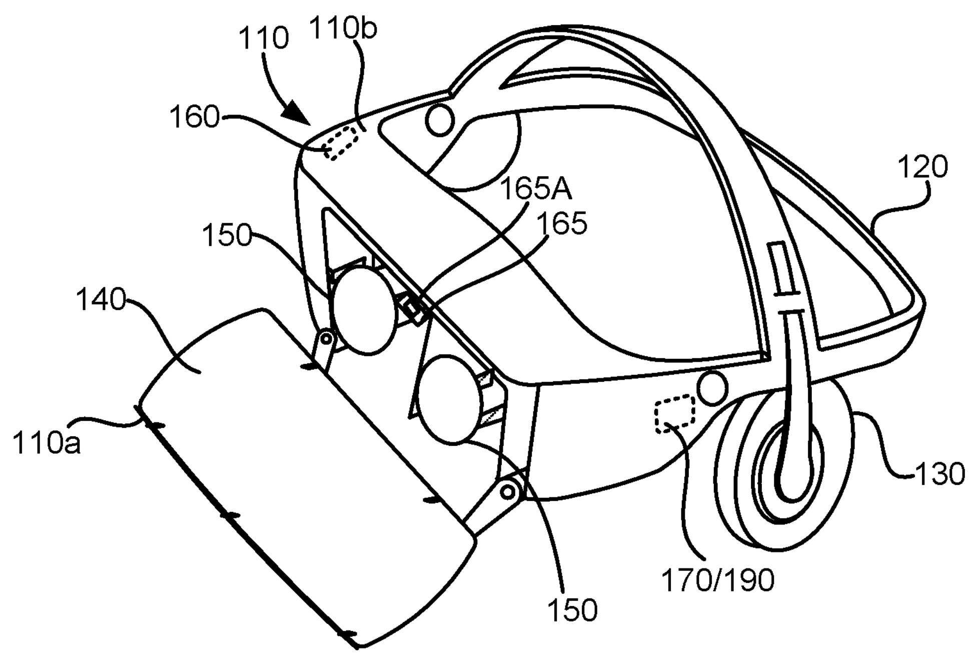

FIGS. 2A and 2B are perspective views of an example HMD, such as, for example, the HMD 100 worn by the user in FIG. 1 to generate and display an augmented and/or virtual reality environment. The HMD 100 may include a housing 110 in which optical components may be received. The housing 110 may be coupled, for example, rotatably coupled and/or removably attachable, to a frame 120 which allows the housing 110 to be mounted or worn on the head of the user. An audio output device 130 may also coupled to the frame 120, and may include, for example, speakers mounted in headphones and coupled on the frame 120.

In FIG. 2B, a front face 110*a* of the housing 110 is rotated away from a base portion 110*b* of the housing 110 so that some of the components received in the housing 110 are visible. A display 140 may be mounted on the front face 110*a* of the housing 110. Lenses 150 may be mounted on mounting structure 155 in the housing 110, between the user's eyes and the display 140 when the front face 110*a* is in the closed position against the base portion 110*b* of the housing 110. A position of the lenses 150 may be adjusted by an adjustment device 158, so that the lenses 150 may be aligned with respective optical axes of the user's eyes to provide a relatively wide field of view and relatively short focal length.

The HMD 100 may also include a sensing system 160 including various sensing system devices 162 through 164 and a control system 170 including various control system devices 171 through 176 to facilitate operation of the HMD 100. The control system 170 may also include a processor 190 operably coupled to the components of the control system 170.

The HMD 100 may also include a camera 180 which may capture still and/or moving images of the real world environment, or ambient environment. In some implementations, the images captured by the camera 180 may be displayed to the user on the display 140 in a pass through mode, allowing the user to temporarily leave the virtual environment and return to the real world without removing the HMD 100 or otherwise changing the configuration of the HMD 100 to move the housing 110 out of the line of sight of the user. In some implementations, images captured by the camera 180 may be rendered by the system and displayed as rendered images on the display 140.

Figure 3:
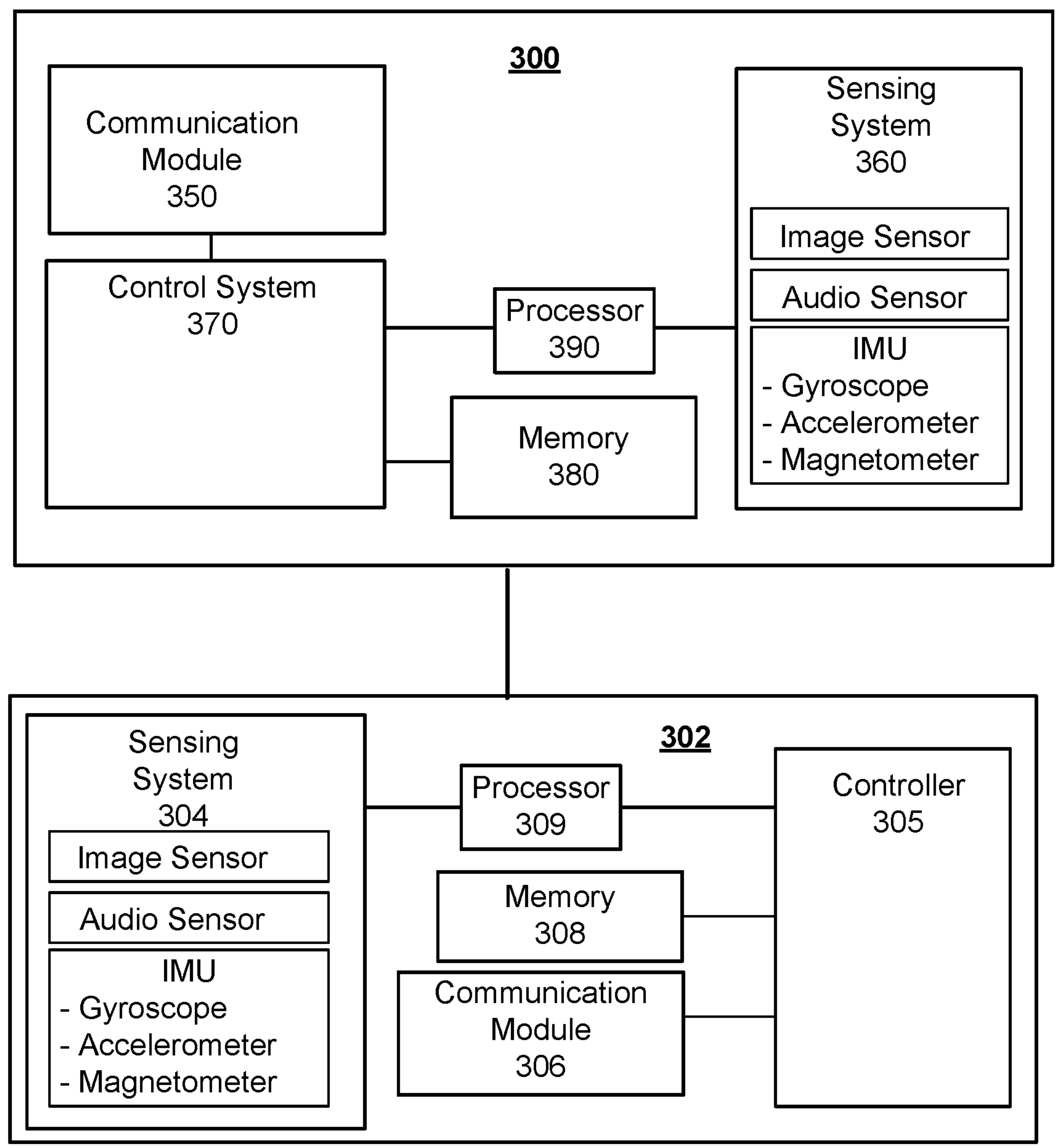
FIG. 3 is a block diagram of a head mounted display device and a handheld electronic device, in accordance with implementations as described herein.

A block diagram of a system for tracking and displaying a handheld device in an augmented and/or virtual reality environment is shown in FIG. 3. The system may include a first user electronic device 300 in communication with one (or more) second user electronic device(s) 302. The first user electronic device 300 may be, for example an HMD as described above with respect to FIGS. 2A and 2B, generating an augmented and/or virtual reality environment to be displayed to the user, and the second user electronic device 302 may be, for example, a handheld electronic device as described above with respect to FIG. 1, that facilitates user interaction with virtual features in the virtual environment generated and displayed by the HMD. For example, as described above, physical movement of the second (handheld) electronic device 302 in the physical 3D space may be translated into a desired interaction in the virtual environment generated and displayed by the first (head mounted) electronic device 300.

The first electronic device 300 may include a sensing system 260 and a control system 370, which may be similar to the sensing system 160 and the control system 170, respectively, shown in FIGS. 2A and 2B. In the example shown in FIG. 3, the sensing system 360 may include numerous different types of sensors, including, for example, a light sensor, a distance/proximity sensor, an audio sensor as in the HMD 100 shown in FIGS. 2A and 2B, as well as other sensors and/or different combination(s) of sensors. In some implementations, the light sensor, image sensor and audio sensor may be included in one component, such as, for example, a camera, such as the camera 180 of the HMD 100 shown in FIGS. 2A and 2B. The control system 370 may include numerous different types of devices, including, for example, a power/pause control device, audio and video control devices, an optical control device, a transition control device, as well as other such devices and/or different combination(s) of devices. In some implementations, the sensing system 360 and/or the control system 370 may include more, or fewer, devices, depending on a particular implementation. The elements included in the sensing system 360 and/or the control system 370 can have a different physical arrangement (e.g., different physical location) within, for example, an HMD other than the HMD 100 shown in FIGS. 2A and 2B.

The first electronic device 300 may also include a processor 390 in communication with the sensing system 360 and the control system 370, a memory 380 accessible by, for example, a module of the control system 370, and a communication module 350 providing for communication between the first electronic device 300 and another, external device, such as, for example, the second electronic device 302 paired to the first electronic device 300.

The second electronic device 302 may include a communication module 306 providing for communication between the second electronic device 300 and another, external device, such as, for example, the first electronic device 300 operably coupled to or paired with the second electronic device 302. The second electronic device 302 may include a sensing system 304 including a plurality of different sensors. For example, in some implementations, the sensing system 304 may including an IMU, the IMU including, for example, an accelerometer, a gyroscope, as well as other sensors and/or different combination(s) of sensors. A processor 309 may be in communication with the sensing system 304 and a controller 305 of the second electronic device 302, the controller 305 accessing a memory 308 and controlling overall operation of the second electronic device 302.

Figure 4:
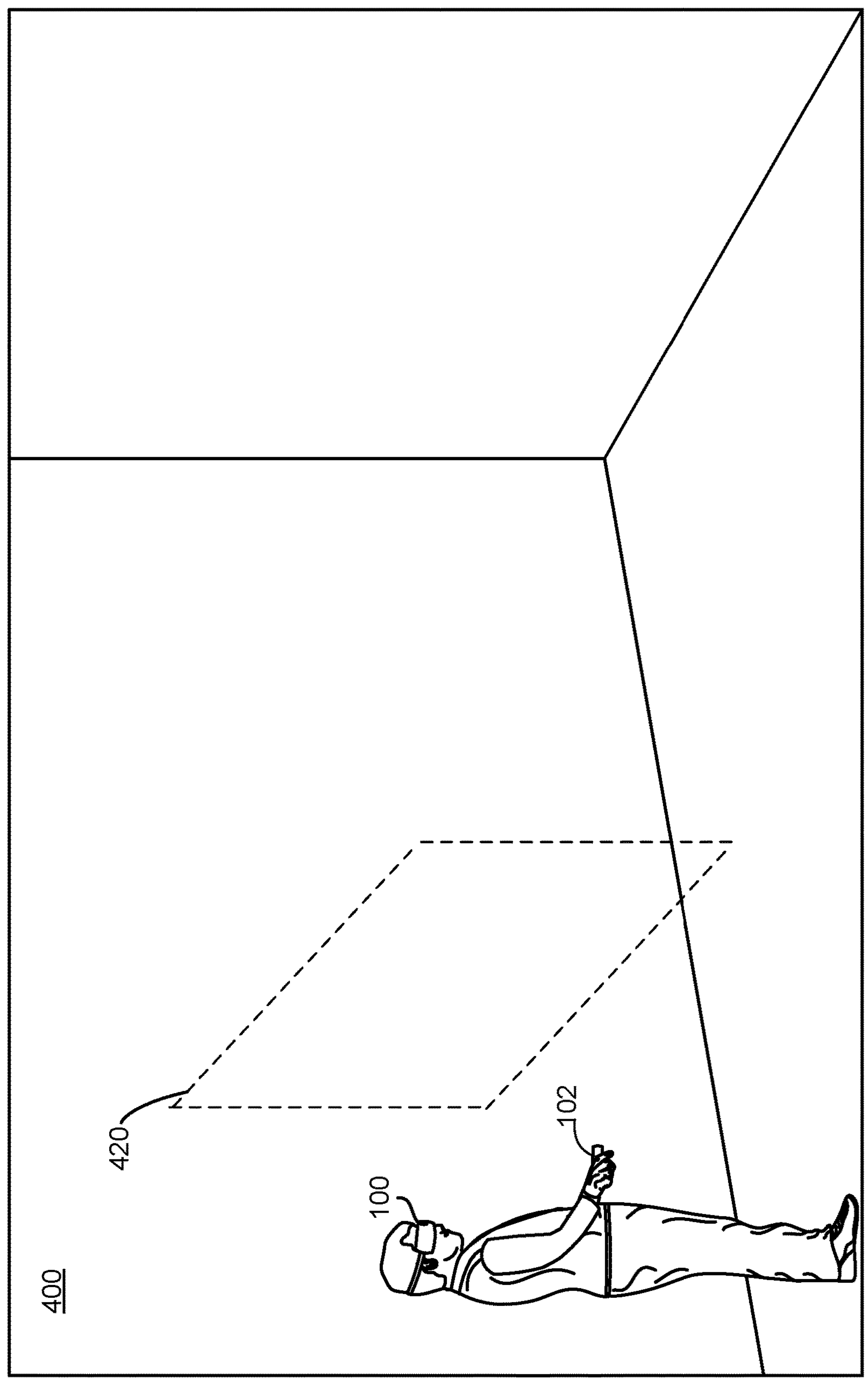
FIGS. 4, 5A-5B, 6A-6B, 7A-7B and 8A-8B are example implementations of a system and method for virtual object tracking in a head mounted reference frame, in an augmented reality and/or virtual reality environment, in accordance with implementations described herein.

An example implementation of a system for tracking and displaying an ambient object, such as, for example, a handheld electronic device is shown in FIG. 4. FIG. 4 provides a third person view of a user in a physical space, or ambient environment 400, wearing an HMD 100 and holding a handheld electronic device 102, or controller 102. In this example, the user is viewing a virtual display 420 generated by the HMD 100 and displayed to the user, for example, on the display 140 of the HMD 100. In this example, the virtual display 420 may be visible to the user within the confines of the HMD 100, but is illustrated outside of the HMD 100 in FIG. 4 for clarity in explanation. In this example, other physical features, objects and the like in the ambient environment 400, such as, for example, the controller 102, may not be directly visible to the user while the user is wearing the HMD 100. As noted above, the user may interact with various virtual features, objects, and the like displayed as part of the virtual display 420 in the virtual environment 400 by moving the controller 102, directing the controller 102 and/or a virtual beam from the controller 102 toward the virtual features/objects, and/or otherwise manipulating the controller 102. In this example, the controller 102 may not be directly visible to the user, but a position and/or orientation of the controller 102 may be detected and tracked by the system, and an image of the tracked controller 102 may be rendered and displayed to the user as a virtual object of the virtual display 420 in the virtual environment, to facilitate a connection for the user between the controller 102 in the ambient environment 400 and interaction with the virtual display 420 in the virtual environment via manipulation of the controller 102.

Figure 5B:
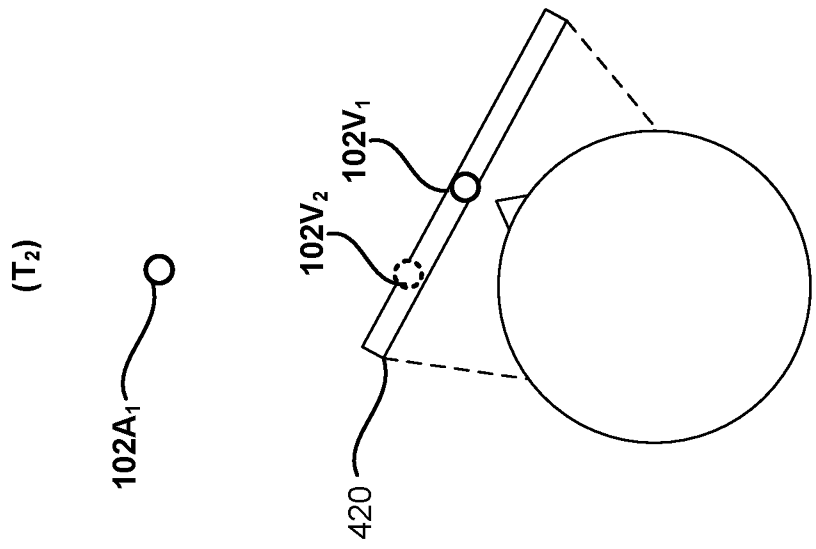
Figure 5A:
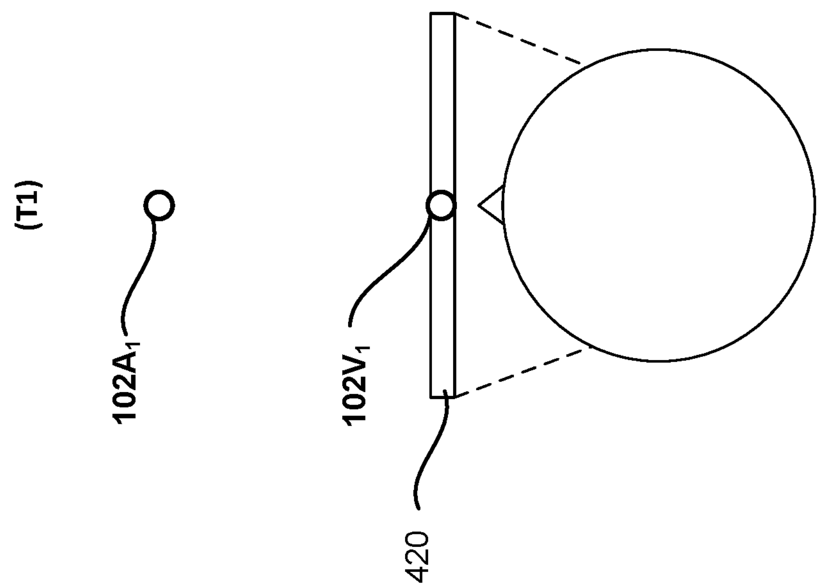

FIGS. 5A and 5B are a top down views of a user wearing the HMD 100, viewing the virtual display 420, for example, on the display 140 of the HMD 100, and holding the controller 102 operably coupled to, or paired with, the HMD 100. In FIG. 5A, at time T1, the user views the virtual display 420 with the controller 102 held at a position 102$A_1$ in the ambient environment, essentially straight out ahead of the user. At time $T_1$, the system, which may track a position and/or orientation of the controller 102 as described above, may render and display the rendered image of the controller 102 at the virtual position 102$V_1$ in the virtual display 420 of the virtual environment. This may allow the user to view the rendered image of the controller 102, to facilitate user manipulation of the controller 102 and interaction with virtual features, objects, elements and the like displayed in the virtual display 420 of the virtual environment.

At a time $T_2$ shown in FIG. 5B, the user has moved, or turned, or rotated, his head by some amount (for example, 30 degrees for ease of discussion and illustration). As the display 140 displaying the virtual display 420 of the virtual environment is included in the HMD 100 worn by the user, as the user rotates his head, the HMD 100 and the virtual display 420 also rotate by the same amount (for example, 30 degrees). In this example, although at the time $T_2$ the user's head, and the HMD 100 and the virtual display 420, are in the rotated position, the user has not moved the controller 102, and the controller 102 remains at the position 102$A_1$ in the ambient environment. However, because in some situations the system may have not yet updated the position of the controller 102 at the time $T_2$, the controller 102 may still be rendered in the virtual display 420 at the virtual position 102$V_1$, inaccurately reflecting essentially the same amount of movement or rotation as the user's head and the virtual display 420. Rather, an accurate rendering of the controller's actual (essentially unchanged) position 102$A_1$ in the ambient environment would be displayed in the virtual display 420 at the position 102$V_2$.

This disconnect, or mismatch, between the actual position 102$A_1$ of the controller 102 in the ambient environment at time $T_2$ (and the correct virtual position 102$V_2$ of the controller 102 in the virtual display 420 at time $T_2$), versus the display of the controller 102 in the virtual display 420 at the virtual position 102$V_1$ (because the controller 102 location information has not yet been updated) at the time $T_2$ may hinder the effective use of the controller 102 for interacting with virtual features, objects, elements and the like available in the virtual display 420 in the virtual environment.

In a system and method, in accordance with implementations as described herein, the system may implement a forward-prediction function or algorithm, taking into account sensor data related to the controller 102, for example, sensor data provided by the IMU, as well as other sensors included in the controller 102 and/or the HMD 100, historical controller movement and trajectory patterns, and the like, to account for the actual physical position of the controller 102 in rendering the controller 102 in the virtual display 420.

Figures 6A, 6B:
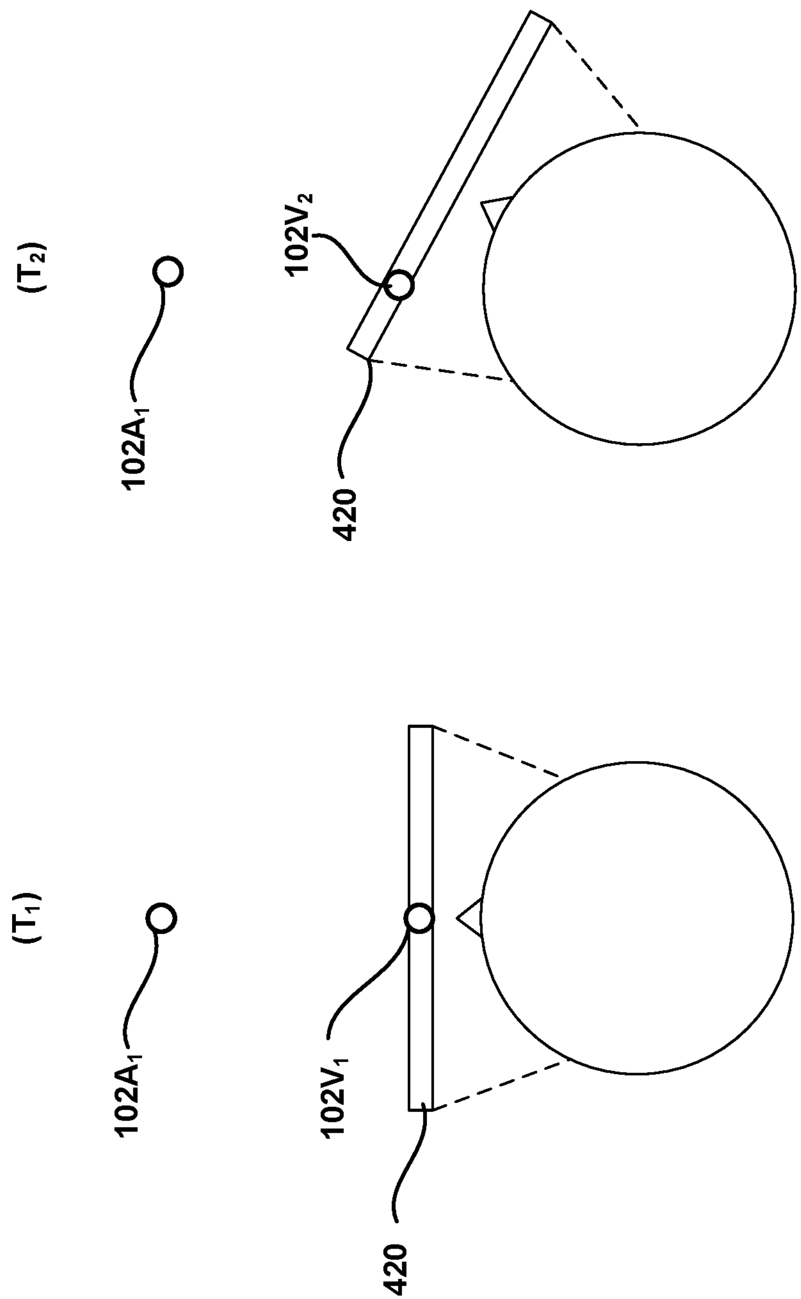

As shown in FIG. 6A, at the time $T_1$, the user views the virtual display 420 while holding the controller 102 at the position 102$A_1$ in the ambient environment, essentially straight out ahead of the user, and the system may render and display the rendered image of the controller 102 at the virtual position 102$V_1$ in the virtual display 420 (as described above with respect to FIG. 5A). As shown in FIG. 6B, at the time $T_2$, the user's head has rotated, but a new measure of the position of the controller 102 has not necessarily been taken. However, in this example, the system may assume that the position of the controller 102 in the ambient environment remains at the position 102$A_1$, even in the event that the user's head (and the HMD 100 and the virtual display 420) have rotated, until, for example, a new measure of the position of the controller 102 in the ambient environment is taken. This type of forward-prediction may allow the display of the rendered image of the controller 102 to be at essentially the correct position even when a new measure of the position of the controller 102 is not received in a timely manner. In the example shown in FIG. 6B, the assumption is made that the controller 102 remains fixed in the ambient environment, even though a movement (for example, rotation) of the user's head (and the HMD 100 and the virtual display 420) has been detected, and thus the controller 102 is rendered in the virtual display 420 at the virtual position 102$V_2$, until, for example, a new measure of the position of the controller 102 is taken. The display of the rendering of the controller 102 at the virtual position 102$V_2$ shown in FIG. 6B corresponds to an essentially unmoved position of the controller 102 in the ambient environment 400, even though the system has detected movement of the user's head and HMD 100. In some situations, this approach may be applied, for example, when a magnitude of the detected movement of the user's head (and the HMD 100 and virtual display 420) is, for example, less than a previously defined threshold.

In the example shown in FIGS. 6A-6B, each time the position and/or orientation, or pose, of the controller 102 is estimated by, for example, the sensing system of the HMD 100, alone, or together with data provided by the sensing system of the controller 102, a position and/or orientation, or pose, of the controller 102 may be estimated with respect to, for example, a fixed point of reference in the ambient environment. The fixed point of reference in the ambient environment may remain fixed in the ambient environment as the user, and/or the user's head and HMD 100, and/or the controller 102, moves in the ambient environment. Thus, movement of the controller 102 in the ambient environment, and movement of the HMD 100 in the ambient environment, may each be tracked, independently, in their own respective frame of reference. As a position of the user's head/HMD 100 in the ambient environment is updated with respect to the fixed point of reference, even though the position of the controller 102 has not been updated, the rendering of the controller 102 into the virtual display 420 of the virtual environment may be independent of the motion of the user's head/HMD 100, with the rendering of the controller 102 being updated independently and re-rendered into the virtual display 420 as updated positions become available. This may allow the controller 102 to be rendered in the virtual display 420 at a relatively accurate position for a relatively large number of instances.

Figures 7A, 7B:
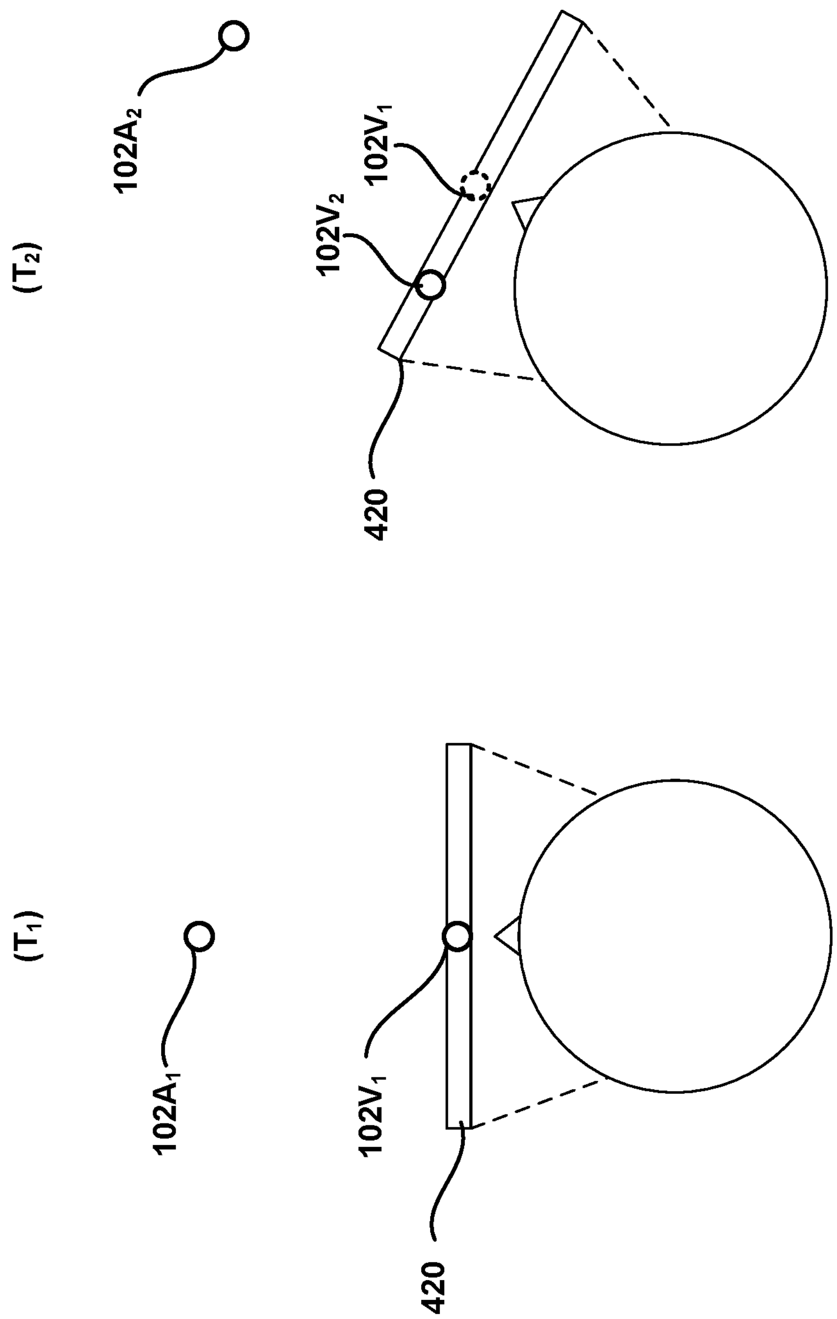

In some situations, the approach described above with respect to FIGS. 6A and 6B may cause some lag between a time when the controller 102 is moved in the ambient environment, and when that movement is reflected in the virtual position at which the rendering of the controller 102 is displayed in the virtual display 420 of the virtual environment. For example, as shown in FIG. 7A, at time $T_1$, the user views the virtual display 420 while holding the controller 102 at the point 102$A_1$ in the ambient environment, essentially straight out ahead of the user, and the system may render and display the rendered image of the controller 102 at the virtual position $PV_1$ in the virtual display 420 (as described above with respect to FIGS. 5A and 6A). As shown in FIG. 7B, at time $T_2$, the user's head (and the HMD 100 and virtual display 420) has moved, or rotated, and the position of the controller 102 has also moved, or rotated, to the position 102$A_2$. If a new position for the controller 102 is not rendered in the virtual display 420 until a new measure of the controller 102 is taken (as described above with respect to FIGS. 6A-6B), the controller 102 will be at the position 102$A_2$ in the ambient environment, but will be rendered at the virtual position 102$V_1$ in the virtual display 420 until a new measure of controller position and/or orientation, or pose, is taken.

Figure 8B:
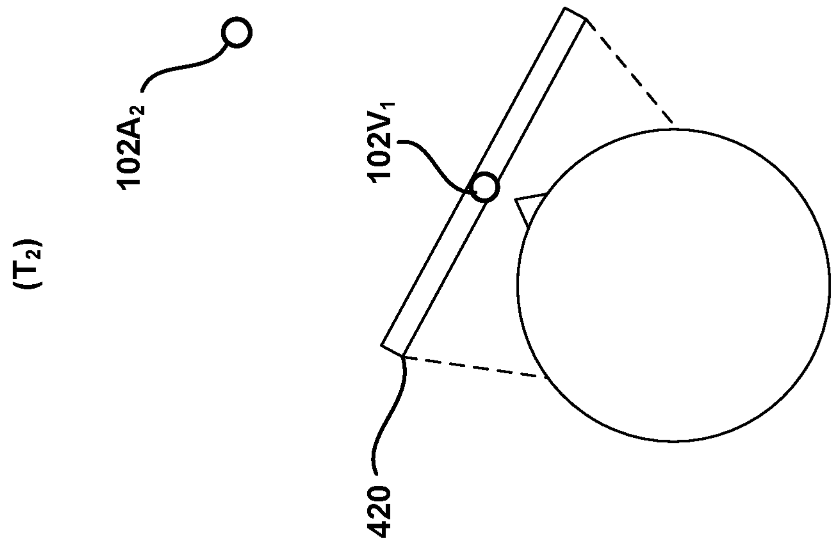
Figure 8A:
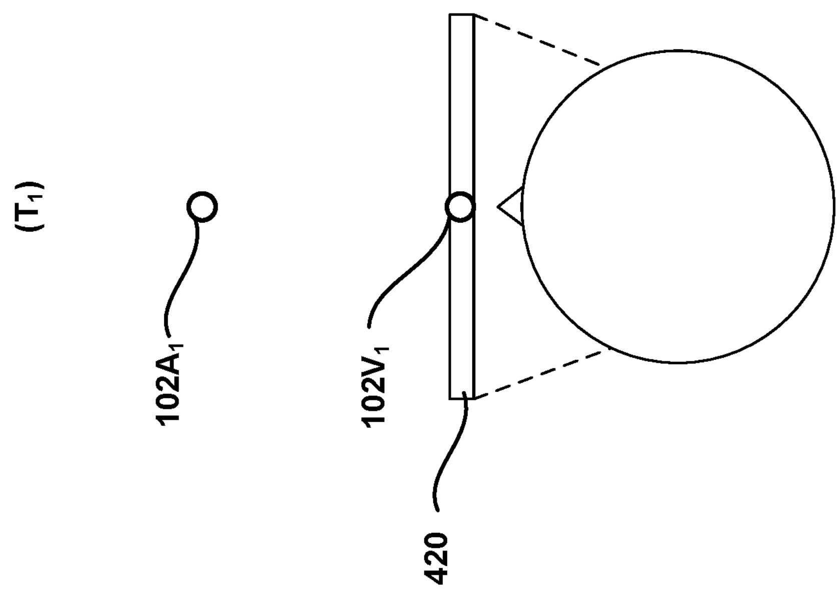

To avoid excessive lag time in rendering changes in position and/or orientation, or pose, of the controller 102, i.e., a lag between when the controller 102 is moved in the ambient environment and when that movement is reflected in virtual position of the rendering of the controller 102 in the virtual display 420 of the virtual environment, the system may predict movement of the controller 102 based on, for example, sensor data provided by the controller 102. This sensor data may include, for example, data provided by the IMU of the sensing system of the controller 102. As shown in FIG. 8A, at time $T_1$, the user views the virtual display 420 while holding the controller 102 at the point 102$A_1$ in the ambient environment, essentially straight out ahead of the user, and the system may render and display the rendered image of the controller 102 at the virtual position 102$V_1$ in the virtual display 420 (as described above with respect to FIGS. 5A, 6A and 7A). As shown in FIG. 8B, at time $T_2$, the user's head (and HMD 100 and virtual display 420) has rotated, and the controller 102 has also moved, from the position 102$A_1$ to the position 102$A_2$, but a new measure of the position and/or orientation, or pose, of the controller 102 has not been taken. In this example, sensor data collected by the sensing system of the controller 102, for example, a gyroscope and/or an accelerometer and/or a magnetometer included in the IMU of the controller 102, may sense the motion of the controller 102 (for example, a movement and/or acceleration to the right by approximately 30 degrees in the example shown in FIGS. 8A-8B). This sensor data may be transmitted from the controller 102 to the HMD 100, so that the rendered image of the controller 102 may be correctly rendered at the virtual position 102$V_1$ in the virtual display 420, as shown in FIG. 8B. Synthesis, or fusion, of sensor data collected, for example, from the IMU of the controller 102 and the IMU of the HMD 100, may improve accuracy in determining and updating the position of the controller 102, and in particular, the position of the controller 102 with respect to the HMD 100, allowing the controller 102 to be rendered at a more accurate position in the virtual display 420 of the virtual environment generated by the HMD 100 as the user's head (and the HMD 100) moves, and the controller moves 102, in the ambient environment.

In some implementations, a combination of the principles described above with respect to FIGS. 6A-6B (which account for movement of the HMD 100 and display 140/virtual display 420 relative to the fixed frame of reference in the ambient environment), together with the principles described above with respect to FIGS. 8A-8B (which account for movement of the controller 102 relative to the fixed frame of reference in the ambient environment), and the fusion of data collected from sensors of the controller 102 and sensors of the HMD 100, may be applied to determine a virtual position at which the controller 102 may be rendered in the virtual display 420. In some implementations, some or all of these computations may be performed by the processor of the HMD 100. In some implementations, some or all of these computations may be performed by the processor of the controller 102. In some implementations, some or all of these computations may be performed by a processor of a base station operably coupled with the HMD 100 and/or the controller 102. In some implementations, the computational load may be shared amongst the HMD 100 and/or the controller 102 and/or the base station.

The examples above have focused on the accurate virtual rendering position of the controller 102 in the virtual display 420. However, these principles may be applied in tracking other objects which are moving the ambient environment, and which may be virtually rendered in the virtual display 420, such as, for example, other users in the virtual environment and the like. The examples above indicate data from a sensing system on the HMD 100, such as for example, an image sensor included in a camera of the HMD 100, may be used to capture position and/or orientation and/or pose data related to the controller. However, other elements included in a sensing system, such as, for example, electromagnetic sensors, light/infrared sensors, audio sensors, an IMU including, for example, an accelerometer and/or a gyroscope and/or a magnetometer, and the like may also provide information used in capturing position and/or orientation and/or pose data related to the controller 102.

In some implementations, the controller 102 and the HMD 100, for example, the sensors of the controller 102 and the sensors of the HMD 100, may be time synchronized, so that the controller 102 and the HMD 100 may operate on essentially the same clock. Time synchronization and operation on the same clock may allow time-stamped signals transmitted between the controller 102 and the HMD 100, for example, signals included data collected by the sensors as described above, to be applied to a common time reference. This may allow for improved precision and accuracy in matching a particular head/HMD 100 position with a corresponding position of the controller 102, and a corresponding virtual position for the display of the rendering of the controller 102 in the virtual display 420 of the virtual environment. This time synchronization between the controller 102 and the HMD 100 may be established and maintained in accordance with a set protocol.

In compensating for head (and HMD) motion and/or controller motion in rendering elements in the virtual display 420 as described above, a first frame of reference with respect to the ambient environment, as well as the common, synchronized time reference, may be established with respect to the HMD 100. Once a pose of the controller 102 is captured within these frames of reference, and time-stamped data from one or more additional sensors of the controller 102 and/or the HMD 100 is taken into account as described above, the system may forward-predict the motion of the controller 102 relative to the physical frame of reference based on the time-stamped sensor data. These transforms, from the frame of reference of the HMD 100 relative to a fixed frame of reference in the ambient environment, and from the frame of reference of the controller 102 relative to the fixed frame of reference in the ambient environment, into the same frame of reference, taken together with data from the sensing systems of the controller 102 and/or the HMD 100 in the common, synchronized time reference, as described above, may be represented by a series of matrix transforms shown in Equations 1, 2 and 3.

$$^{A}T_{C1}={}^{A}T_{H1}{}^{H1}T_{C1} \quad \text{Equation 1}$$

$$^{A}T_{C2}=f(^{A}T_{C1}) \quad \text{Equation 2}$$

$$^{H2}T_{C2}={}^{H2}T_{A}{}^{A}T_{C2} \quad \text{Equation 3}$$

For example, a position of the controller 102 with respect to a fixed, ambient environment coordinate at time $T_1$, independent of head/HMD 100 position, may be determined by Equation 1. In particular, in equation 1, the product of the matrix transformation $^{A}T_{H1}$ (the matrix transform of the position of the HMD 100 to the fixed ambient environment at time $T_1$) and the matrix transformation $^{H1}T_{C1}$ (the matrix transform of the position of the controller 102 with respect to the position of the HMD 100 at time $T_1$), may yield the controller position with respect to the fixed ambient environment $^{A}T_{C1}$ at time $T_1$. In equation 1, the term A represents the ambient environment, C1 represents the position of the controller 102 at time $T_1$, and H1 represents the position of the HMD 100 at time $T_1$, with the time $T_1$ for the controller 102 corresponding to the time $T_1$ for the HMD 100.

From the position of the controller 102 with respect to the fixed ambient environment coordinate determined by equation 1 ($^{A}T_{C1}$), a forward prediction for movement of the controller 102, as described above with respect to FIGS. 6A-6B, may be determined by Equation 2, in which $^{A}T_{C2}$ is the (predicted) position of the controller 102 at time $T_2$ with respect to the fixed ambient environment coordinate, and which is a function of the matrix transform of the position of the controller 102 with respect to the fixed ambient environment $^{A}T_{C1}$.

The position of the controller 102 relative to the HMD 100 (i.e., in a coordinate system of the HMD 100) at time $T_2$, represented by $^{H2}T_{C2}$ in equation 3, may be the product of the matrix transformation of the position of the HMD at time $T_2$ with respect to the fixed coordinate of the ambient environment $^{H2}T_{A}$ and the matrix transformation of the position of the controller 102 at time $T_2$ with respect to the fixed ambient environment coordinate $^{A}T_{c2}$.

Thus, in Equation 1, a position of the controller 102 and the HMD 100 are transformed with respect to a fixed coordinate system, or fixed point of reference, in the ambient environment. Equation 2 may forward predict a position of the controller 102 with respect to the fixed coordinate system, or fixed point of reference, in the ambient environment. Equation 3 may transform the position of the controller 102 to the frame of reference of the HMD 100, so that the controller 102 may be rendered in the virtual display 420 generated by the HMD 100.

Figure 9:
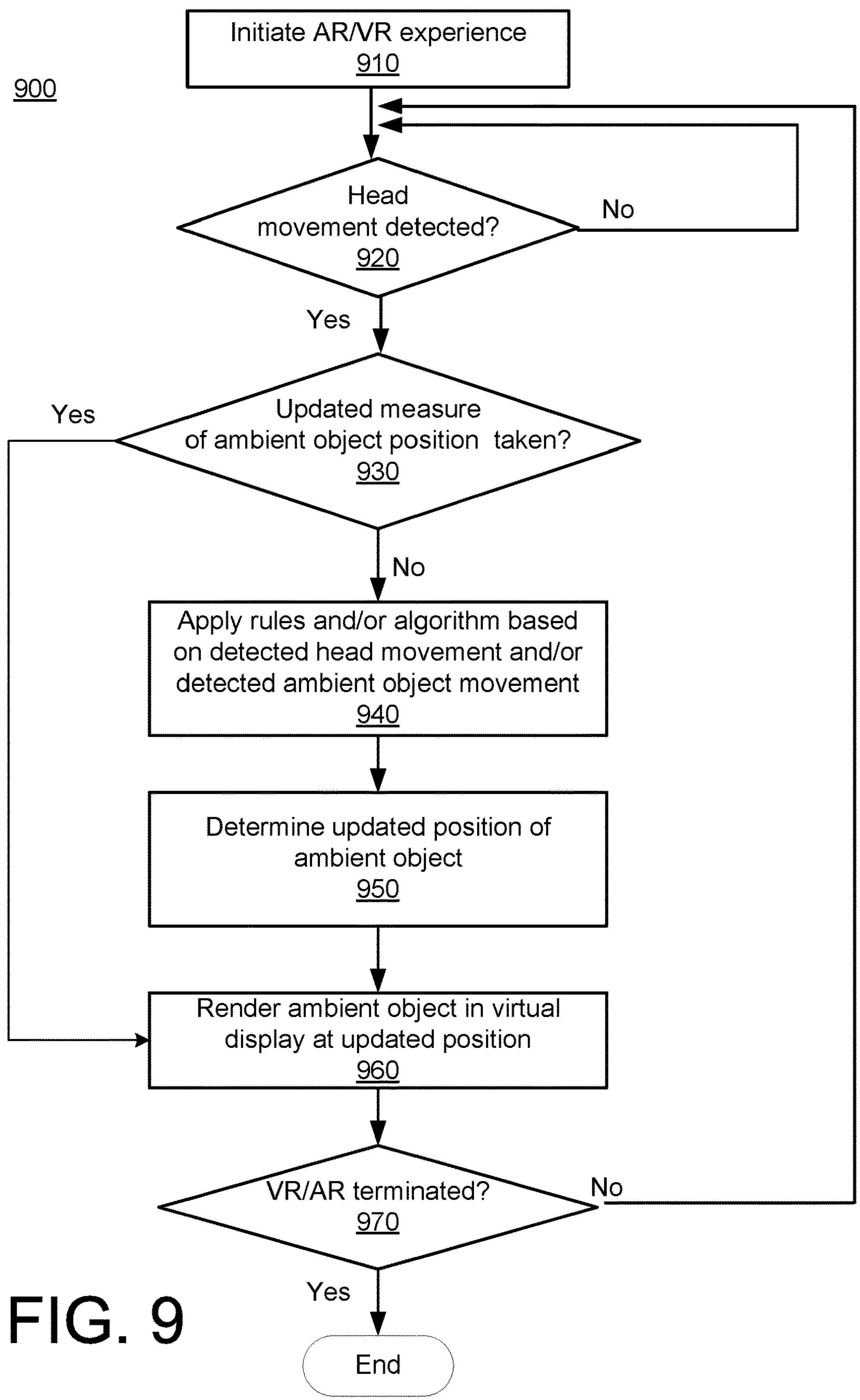
FIG. 9 is a flowchart of a method, in accordance with implementations as described herein.

A method 900 for object tracking in a head mounted reference frame, in an augmented and/or virtual reality environment, in accordance with implementations as described herein, is shown in FIG. 9.

After initiating a virtual and/or augmented reality experience (block 910), the system may detect that the user's head (and HMD 100 and display 140/virtual display 420, as described above) has moved (block 920). If the system detects that the user's head has moved, and an updated measure has not been taken of a position and/or orientation of object in the ambient environment (such as, for example, the controller 102 as described above) being tracked and rendered in the virtual display 420 (block 930), the system may then apply a set of rules and/or algorithms to determine a position at which the controller 102 should be rendered in the virtual display 420 based on the detected head movement (blocks 940, 950), and may render the controller 102 at the updated position in the virtual display 420 (block 960). In some implementations, the updated position of the controller 102 may be determined as described above with respect to FIGS. 6A-6B and/or FIGS. 8A-8B, in combination with Equation 1 and/or Equation 2 and/or Equation 3. The process may continue until the virtual experience is terminated (block 970).

Figure 10:
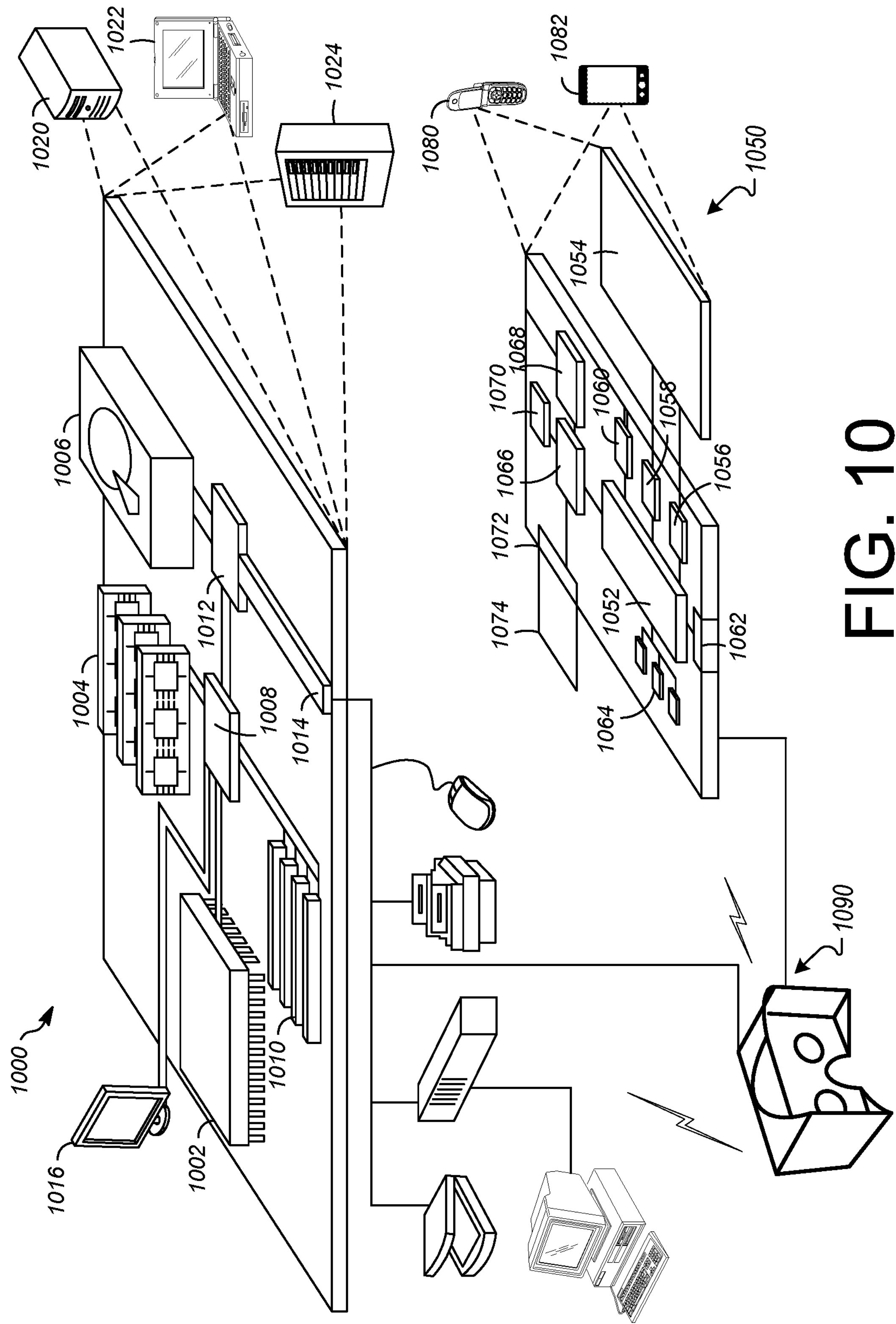
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method, comprising:

displaying a virtual environment on a display of a head mounted electronic device, the head mounted electronic device operating in an ambient environment;

detecting an ambient object in the ambient environment;

detecting a first ambient position of the ambient object in the ambient environment;

displaying a virtual rendering of the ambient object at a first virtual position in the display of the virtual environment, the first virtual position corresponding to the detected first ambient position of the ambient object in the ambient environment;

detecting a movement of the head mounted electronic device, from a first position of the head mounted electronic device to a second position of the head mounted electronic device;

updating a position of the ambient object in the ambient environment based on the detected movement of the head mounted electronic device, including:

detecting a movement of the ambient object in the ambient environment based on sensor data received from the ambient object; and determining a second ambient position of the ambient object in the ambient environment based on the detected movement of the ambient object; and displaying the virtual rendering of the ambient object at a second virtual position in the display of the virtual environment based on the updated position of the ambient object in the ambient environment.

2. The method of claim 1, detecting the movement of the head mounted electronic device including detecting a change in at least one of a position or an orientation of the head mounted electronic device, and updating the position of the ambient object in the ambient environment based on the detected movement of the head mounted electronic device including:

detecting a magnitude of the detected movement of the head mounted electronic device; and maintaining the virtual rendering of the ambient object at the first virtual position in the virtual display of the virtual environment when a magnitude of the detected movement of the head mounted electronic device is less than a previously defined threshold.

3. The method of claim 1, detecting the movement of the head mounted electronic device including:

detecting a change in at least one of a position or an orientation of the head mounted electronic device, and updating the position of the ambient object in the ambient environment based on the detected movement of the head mounted electronic device including:

detecting a magnitude of the detected movement of the head mounted electronic device; and updating the ambient position of the ambient object to a second ambient position, so that the second ambient position of the ambient object relative to the second position of the head mounted electronic device is the same as the first ambient position of the ambient object relative to first position of the head mounted electronic device.

4. The method of claim 1, receiving the sensor data from the ambient object including receiving sensor data from at least one of a gyroscope or an accelerometer of the ambient object.

5. The method of claim 1, detecting the movement of the head mounted electronic device, and updating the position of the ambient object in the ambient environment based on the detected movement of the head mounted electronic device including:

detecting a position of the head mounted electronic device with respect to a fixed coordinate system in the ambient environment;

detecting a position of the ambient object with respect to the fixed coordinate system in the ambient environment; and translating the detected position of the ambient object with respect to the fixed coordinate system in the ambient environment into a translated position of the ambient object with respect to a coordinate system of the head mounted electronic device.

6. The method of claim 5, updating the position of the ambient object in the ambient environment based on the detected movement of the head mounted electronic device also including:

detecting a magnitude of the detected movement of the head mounted electronic device; and updating the ambient position of the ambient object to a second ambient position, so that the second ambient position of the ambient object relative to the second position of the head mounted electronic device is the same as the first ambient position of the ambient object relative to first position of the head mounted electronic device.

7. The method of claim 1, updating the position of the ambient object in the ambient environment based on the detected movement of the head mounted electronic device also including:

receiving sensor data from the head mounted electronic device;

synthesizing the sensor data received from the head mounted electronic device with the sensor data received from the ambient object;

detecting a position of the ambient object with respect to the head mounted electronic device based on the synthesized sensor data; and repeating the receiving, synthesizing and detecting to update the position of the ambient object with respect to the head mounted electronic device substantially in real time.

8. The method of claim 7, wherein the ambient object is a handheld electronic device that is operably coupled to the head mounted electronic device, the method further comprising:

synchronizing a time clock of the handheld electronic device with a time clock of the head mounted electronic device, and synthesizing the sensor data received from the head mounted electronic device with the sensor data received from the ambient object including synthesizing time-stamped sensor data received from the head mounted electronic device with time-stamped sensor data received from the handheld electronic device to update a position of the handheld electronic device with respect to the head mounted electronic device at corresponding points in time.

9. The method of claim 6, displaying the virtual rendering of the ambient object at the second virtual position in the display of the virtual environment based on the updated position of the ambient object in the ambient environment including:

displaying the virtual rendering of the ambient object at the second virtual position in the virtual display of the virtual environment when the magnitude of the detected movement of the head mounted electronic device is greater than or equal to a previously defined threshold, the second virtual position in the virtual display corresponding to the second ambient position in the ambient environment.

10. The method of claim 6, displaying the virtual rendering of the ambient object at the second virtual position in the display of the virtual environment based on the updated position of the ambient object in the ambient environment including:

maintaining the virtual rendering of the ambient object at the first virtual position in the virtual display of the virtual environment when the magnitude of the detected movement of the head mounted electronic device is less than a previously defined threshold.

11. A computer program product embodied on a non-transitory computer readable medium, the non-transitory computer readable medium having stored thereon a sequence of instructions which, when executed by a processor, causes the processor to execute a method, the method comprising:

displaying a virtual environment on a display of a head mounted electronic device operating in an ambient environment;

detecting a handheld electronic device in the ambient environment, the handheld electronic device operating in the ambient environment, and the handheld electronic device being operably coupled to the head mounted electronic device;

detecting a first ambient position of the handheld electronic device in the ambient environment;

displaying a virtual rendering of the handheld electronic device at a first virtual position in the display of the virtual environment, the first virtual position corresponding to the detected first ambient position of the handheld electronic device in the ambient environment;

detecting a movement of the head mounted electronic device, from a first position of the head mounted electronic device to a second position of the head mounted electronic device;

updating a position of the handheld electronic device in the ambient environment based on the detected movement of the head mounted electronic device, including:

detecting a position of the head mounted electronic device with respect to a fixed coordinate system in the ambient environment;

detecting a position of the handheld electronic device with respect to the fixed coordinate system in the ambient environment; and translating the detected position of the handheld electronic device with respect to the fixed coordinate system in the ambient environment into a translated position of the handheld electronic device with respect to a coordinate system of the head mounted electronic device; and displaying the virtual rendering of the handheld electronic device at a second virtual position in the display of the virtual environment based on the updated position of the handheld electronic device in the ambient environment.

12. The computer program product of claim 11, updating the position of the handheld electronic device in the ambient environment based on the detected movement of the head mounted electronic device also including:

detecting a magnitude of the detected movement of the head mounted electronic device; and updating the ambient position of the handheld electronic device to a second ambient position, so that a second ambient position of the handheld electronic device relative to the second position of the head mounted electronic device is the same as the first ambient position of the handheld electronic device relative to first position of the head mounted electronic device.

13. The computer program product of claim 12, detecting the handheld electronic device in the ambient environment including receiving sensor data from the handheld electronic device, the sensor data including data from at least one of a gyroscope or an accelerometer of the handheld electronic device, and updating the position of the handheld electronic device in the ambient environment based on the detected movement of the head mounted electronic device also including:

detecting a movement of the handheld electronic device in the ambient environment based on the sensor data received from the handheld electronic device; and determining the second ambient position of the handheld electronic device in the ambient environment based on the detected movement of the handheld electronic device.

14. The computer program product of claim 13, updating the position of the handheld electronic device in the ambient environment based on the detected movement of the head mounted electronic device also including:

receiving sensor data from the head mounted electronic device;

synthesizing the sensor data received from the head mounted electronic device with the sensor data received from the handheld electronic device;

detecting a position of the handheld electronic device with respect to the head mounted electronic device based on the synthesized sensor data; and repeating the receiving, synthesizing and detecting to update the position of the handheld electronic device with respect to the head mounted electronic device substantially in real time.

15. The computer program product of claim 14, the method further comprising:

synchronizing a time clock of the handheld electronic device with a time clock of the head mounted electronic device, and synthesizing the sensor data received from the head mounted electronic device with the sensor data received from the ambient object including:

synthesizing time-stamped sensor data received from the head mounted electronic device with time-stamped sensor data received from the handheld electronic device to update a position of the handheld electronic device with respect to the head mounted electronic device at corresponding points in time.

16. The computer program product of claim 11, displaying the virtual rendering of the handheld electronic device at the second virtual position in the display of the virtual environment based on the updated position of the handheld electronic device in the ambient environment including:

displaying the virtual rendering of the handheld electronic device at the second virtual position in the virtual display of the virtual environment when a magnitude of the detected movement of the head mounted electronic device is greater than or equal to a previously defined threshold, the second virtual position in the virtual display corresponding to the second ambient position in the ambient environment.

17. The computer program product of claim 11, displaying the virtual rendering of the handheld electronic device at a second virtual position in the display of the virtual environment based on the updated position of the handheld electronic device in the ambient environment including:

maintaining the virtual rendering of the handheld electronic device at the first virtual position in the virtual display of the virtual environment when a magnitude of the detected movement of the head mounted electronic device is less than a previously defined threshold.

18. A computing device, including:

a memory storing executable instructions; and a processor configured to execute the instructions, to cause the computing device to:

display, on a display of a head mounted electronic device operating in an ambient environment, a virtual environment;

detect a handheld electronic device in the ambient environment, the handheld electronic device operating in the ambient environment, and the handheld electronic device being operably coupled to the head mounted electronic device;

detect a first ambient position of the handheld electronic device in the ambient environment;

display a virtual rendering of the handheld electronic device at a first virtual position in the display of the virtual environment, the first virtual position corresponding to the detected first ambient position of the handheld electronic device in the ambient environment;

detect a movement of the head mounted electronic device;

update a position of the handheld electronic device in the ambient environment based on the detected movement of the head mounted electronic device and sensor data received from the handheld electronic device and the head mounted electronic device;

display the virtual rendering of the handheld electronic device at the first virtual position in the display of the virtual environment when a magnitude of the detected movement is less than a previously defined threshold; and display the virtual rendering of the handheld electronic device at a second virtual position in the display of the virtual environment when the magnitude of the detected movement is greater than or equal to the previously defined threshold.

19. A computer-implemented method, comprising:

displaying a virtual environment on a display of a head mounted electronic device, the head mounted electronic device operating in an ambient environment;

detecting an ambient object in the ambient environment;

detecting a first ambient position of the ambient object in the ambient environment;

displaying a virtual rendering of the ambient object at a first virtual position in the display of the virtual environment, the first virtual position corresponding to the detected first ambient position of the ambient object in the ambient environment;

detecting a movement of the head mounted electronic device, from a first position of the head mounted electronic device to a second position of the head mounted electronic device, including detecting a magnitude of the detected movement of the head mounted electronic device;

updating a position of the ambient object in the ambient environment based on the detected movement of the head mounted electronic device; and displaying the virtual rendering of the ambient object in the display of the virtual environment based on the updated position of the ambient object in the ambient environment, including:

maintaining the virtual rendering of the ambient object at the first virtual position in the virtual display of the virtual environment when a magnitude of the detected movement of the head mounted electronic device is less than a previously defined threshold; and displaying the virtual rendering of the ambient object at a second virtual position in the display of the virtual environment when the magnitude of the detected movement of the head mounted electronic device is greater than or equal to the previously defined threshold.

20. A computer-implemented method, comprising:

displaying a virtual environment on a display of a head mounted electronic device, the head mounted electronic device operating in an ambient environment;

detecting an ambient object in the ambient environment;

detecting a first ambient position of the ambient object in the ambient environment;

displaying a virtual rendering of the ambient object at a first virtual position in the display of the virtual environment, the first virtual position corresponding to the detected first ambient position of the ambient object in the ambient environment;

detecting a movement of the head mounted electronic device, from a first position of the head mounted electronic device to a second position of the head mounted electronic device;

updating a position of the ambient object in the ambient environment based on the detected movement of the head mounted electronic device, including:

detecting a position of the head mounted electronic device with respect to a fixed coordinate system in the ambient environment;

detecting a position of the ambient object with respect to the fixed coordinate system in the ambient environment;

translating the detected position of the ambient object with respect to the fixed coordinate system in the ambient environment into a translated position of the ambient object with respect to a coordinate system of the head mounted electronic device; and displaying the virtual rendering of the ambient object at a second virtual position in the display of the virtual environment based on the updated position of the ambient object in the ambient environment.

21. A computer-implemented method, comprising:

displaying a virtual environment on a display of a head mounted electronic device, the head mounted electronic device operating in an ambient environment;

detecting an ambient object in the ambient environment;

detecting a first ambient position of the ambient object in the ambient environment;

displaying a virtual rendering of the ambient object at a first virtual position in the display of the virtual environment, the first virtual position corresponding to the detected first ambient position of the ambient object in the ambient environment;

detecting a movement of the head mounted electronic device, from a first position of the head mounted electronic device to a second position of the head mounted electronic device;

updating a position of the ambient object in the ambient environment based on the detected movement of the head mounted electronic device, including:

receiving sensor data from the head mounted electronic device;

synthesizing the sensor data received from the head mounted electronic device with sensor data received from the ambient object;

detecting a position of the ambient object with respect to the head mounted electronic device based on the synthesized sensor data; and repeating the receiving, synthesizing and detecting to update the position of the ambient object with respect to the head mounted electronic device substantially in real time; and displaying the virtual rendering of the ambient object at a second virtual position in the display of the virtual environment based on the updated position of the ambient object in the ambient environment.

* * * * *